United States Patent
Ookawa et al.

(10) Patent No.: US 8,268,908 B2
(45) Date of Patent: Sep. 18, 2012

(54) PIGMENT DISPERSION LIQUID, INKJET RECORDING INK, INKJET RECORDING METHOD, INK CARTRIDGE AND INKJET RECORDING APPARATUS

(75) Inventors: Takayuki Ookawa, Fukui (JP); Junko Chizuwa, Fukui (JP); Tomoya Yamamoto, Awara (JP); Suzuka Ueno, Fukui (JP)

(73) Assignee: Canon Finetech Inc., Saitama-ken (JP)

( * ) Notice: Subject to any disclaimer, the term of this patent is extended or adjusted under 35 U.S.C. 154(b) by 648 days.

(21) Appl. No.: 12/492,694

(22) Filed: Jun. 26, 2009

(65) Prior Publication Data
US 2010/0021635 A1 Jan. 28, 2010

(30) Foreign Application Priority Data

Jun. 27, 2008 (JP) ................. 2008-168443
Jun. 10, 2009 (JP) ................. 2009-139331

(51) Int. Cl.
*C09D 11/00* (2006.01)
(52) U.S. Cl. ......... 523/160; 523/161; 427/256; 524/599
(58) Field of Classification Search .............. 523/160, 523/161
See application file for complete search history.

(56) References Cited

U.S. PATENT DOCUMENTS

| | | | |
|---|---|---|---|
| 5,085,698 A | 2/1992 | Ma et al. | |
| 5,221,334 A | 6/1993 | Ma et al. | |
| 5,272,201 A | 12/1993 | Ma et al. | |
| 6,229,675 B1 * | 5/2001 | Tanaka et al. | 360/265 |
| 6,299,675 B1 * | 10/2001 | Ono et al. | 106/31.27 |
| 7,446,135 B2 | 11/2008 | Ham et al. | |
| 7,481,525 B2 | 1/2009 | Yamamoto et al. | 347/100 |
| 2004/0116553 A1 * | 6/2004 | Nakamura et al. | 523/160 |
| 2006/0281853 A1 | 12/2006 | Yamagishi et al. | 524/547 |
| 2007/0105980 A1 | 5/2007 | Yamamoto et al. | 523/160 |
| 2008/0168922 A1 * | 7/2008 | Nakata et al. | 106/31.13 |
| 2009/0162552 A1 | 6/2009 | Chizuwa et al. | 427/256 |

FOREIGN PATENT DOCUMENTS

| | | |
|---|---|---|
| JP | 4-227668 | 8/1992 |
| JP | 5-179183 | 7/1993 |
| JP | 2005-177756 | 7/2005 |
| JP | 2006-282760 | 10/2006 |

* cited by examiner

*Primary Examiner* — Doris Lee
(74) *Attorney, Agent, or Firm* — Fitzpatrick, Cella, Harper & Scinto

(57) ABSTRACT

To provide a pigment dispersion liquid which provides an ink capable of recording an image having high fixability and fastness such as scratch resistance and excellent quality stably for a long time in any conditions. A pigment dispersion liquid mainly containing a polymer dispersant, a coloring material and water, in which the polymer dispersant is formed of at least a hydrophobic unit and a hydrophilic unit, the hydrophobic unit having a block portion formed of at least one hydrophobic monomer, the coloring material is formed of a pigment having on its surface an acid form anionic group, and the pigment dispersion liquid further contains a basic compound capable of forming a complex with an alkaline metal.

9 Claims, 4 Drawing Sheets

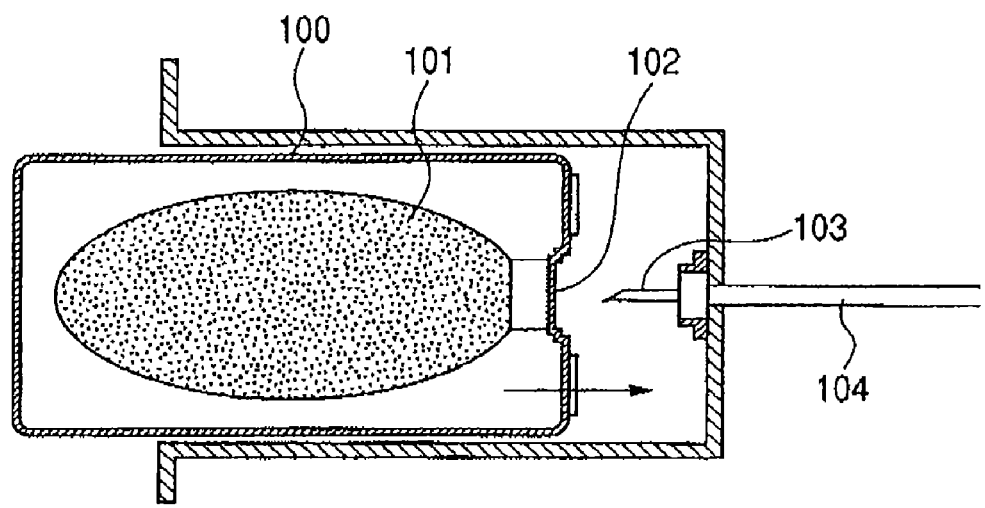
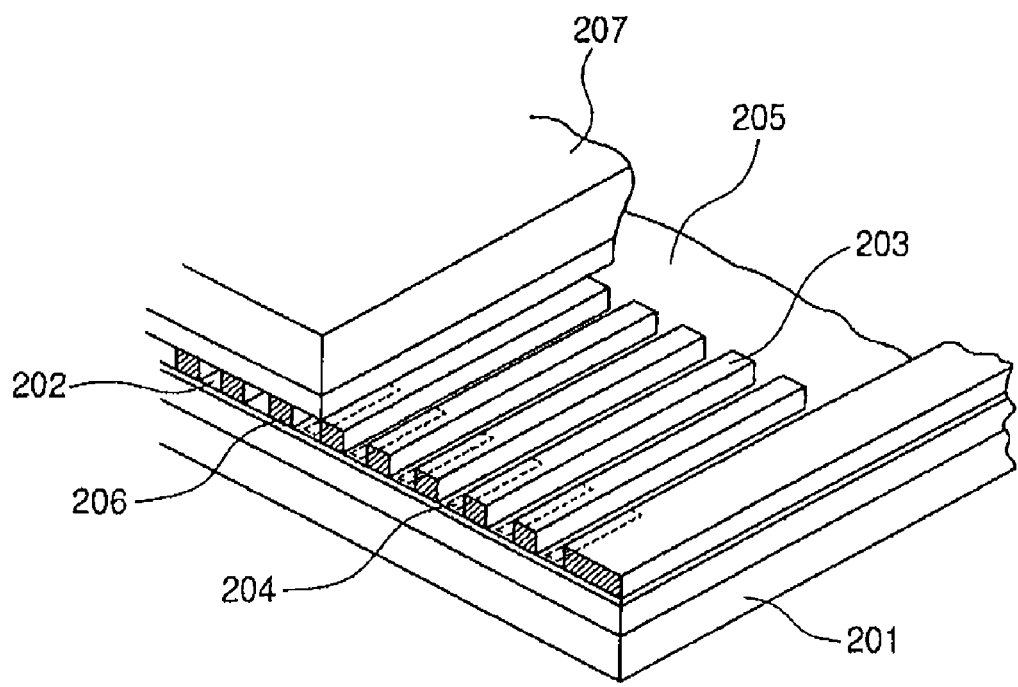

PIGMENT DISPERSION LIQUID, INKJET RECORDING INK, INKJET RECORDING METHOD, INK CARTRIDGE AND INKJET RECORDING APPARATUS

BACKGROUND OF THE INVENTION

1. Field of the Invention

The present invention relates to a pigment dispersion liquid, an inkjet recording ink (hereinafter sometimes simply referred to as the "ink"), an inkjet recording method, an ink cartridge and an inkjet recording apparatus. More particularly, the present invention relates to a pigment dispersion liquid having a coloring material dispersed therein, which has high storage stability, can provide good fixability and fastness of images, and is suitable for inkjet recording, and to an aqueous ink for inkjet recording as well as an inkjet recording method, an ink cartridge and an inkjet recording apparatus using the ink.

2. Description of the Related Art

Conventionally, as colorants of printing inks, water-insoluble coloring materials, for example, pigments having excellent fastness (water resistance and light resistance, etc.) have been widely used. However, in order to use the water-insoluble coloring material as a coloring material for an aqueous ink, it is demanded that the water-insoluble coloring material should be dissolved stably in an aqueous medium. For this purpose, a dispersing agent such as a polymer compound and a surfactant is added to disperse a water-insoluble coloring material homogenously in an aqueous medium. Such coloring-material dispersed aqueous inks have been used.

Recently, aqueous inks having a coloring-material dispersed therein have been increasingly used in inkjet recording for the reason of image fastness. In the inkjet recording, to improve ink fixability and water resistance on paper, attempts to impart aggregation properties and water insolubility to coloring-material particles to be used in ink have been made. However, when such properties are imparted to the coloring-material particles, the dispersion stability of the coloring material in ink decreases. Coloring-material particles are aggregated during the storage of ink, so that nonuniform concentration or precipitation of the ink is liable to take place. In addition, clogging is liable to occur at the tip of a nozzle of an inkjet apparatus by drying of ink, with the result that the ejection stability of ink decreases. These problems are accompanied.

To solve the aforementioned problems, Japanese Patent Application Laid-Open Nos. H4-227668, H5-179183 and 2005-177756 propose an ink containing a block polymer having a specific structure, i.e., an acrylic monomer structure, in a hydrophilic segment. In these polymers, however, the affinity of a hydrophilic monomer structure forming a polymer for a recording medium is insufficient. Therefore, when a coloring material dispersion liquid containing such a polymer is used as ink, ink fixability and fastness such as scratch resistance do not reach virtually satisfactory levels. Furthermore, when continuous printing is required for a long time, like in industrial uses, there is a problem in that the ejection stability of ink greatly decreases.

Furthermore, Japanese Patent Application Laid-Open No. 2006-282760 proposes an ink containing a polymer dispersant and a urethane resin. However, the ink has a problem. The dispersion stability of a coloring material greatly decreases during a long term storage and high-temperature storage. Furthermore, when continuous printing is required for a long time, like in industrial uses, the ejection stability of ink greatly decreases. Moreover, when such an ink is used in an inkjet recording apparatus for recording an image by causing ink to fly by applying thermal energy, coloring-material particles are significantly aggregated by heat generation, inhibiting ejection of ink. This is also a problem.

SUMMARY OF THE INVENTION

The present invention was attained in view of the aforementioned problems and directed to provide a pigment dispersion liquid improved in dispersion stability and capable of improving storage stability and ejection stability of ink. The present invention is further directed to provide an ink and an inkjet method capable of recording an image having excellent fastness and quality, and also directed to an ink cartridge and an inkjet recording apparatus employing such an ink.

The present inventors have conducted intensive studies with a view to solving the aforementioned problems. As a result, it was found that the problems can be solved by the following invention. To describe more specifically, the present invention provides a pigment dispersion liquid mainly containing a polymer dispersant, a coloring material and water, in which the polymer dispersant is formed of at least a hydrophobic unit and a hydrophilic unit, the hydrophobic unit having a block portion formed of at least one hydrophobic monomer, the coloring material is formed of a pigment having on its surface an acid form anionic group, and the pigment dispersion liquid further contains a basic compound capable of forming a complex with an alkaline metal.

Furthermore, according to the present invention, the hydrophilic unit has at least a repeating unit structure of an acrylic amide structure represented by the following general formula (1):

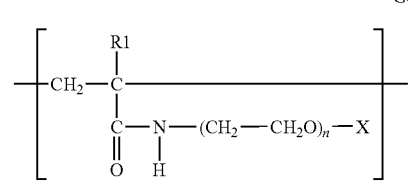

General formula (1)

where R1 represents a hydrogen atom or a methyl group; X represents a hydrogen atom or an alkyl group having 1 to 4 carbon atoms; and n is 1 to 10.

The block portion formed of a hydrophobic monomer of the hydrophobic unit can be a block portion formed of a repeating unit structure represented by the following general formula (2):

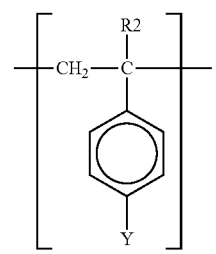

General formula (2)

where R2 represents a hydrogen atom or a methyl group; Y represents —R3, —OR3 or —COOR3, in which R3 represents an alkyl group having 1 to 18 carbon atoms.

The hydrophilic unit may have a segment having an anionic group. The hydrophilic unit may have a block portion formed of the repeating unit structure of the general formula (1) and a block portion of the segment having an anionic group. The basic compound can be at least one compound selected from the group consisting of the following general formulas (3) to (6):

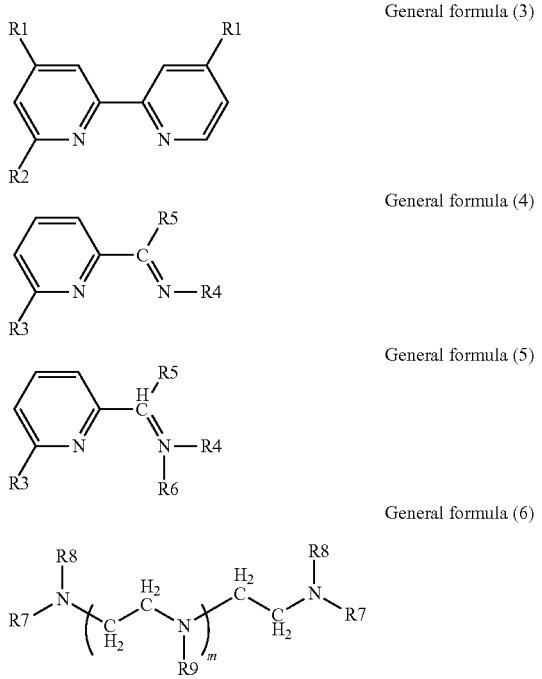

General formula (3)
General formula (4)
General formula (5)
General formula (6)

where R1 represents a hydrogen atom or an alkyl group having 1 to 18 carbon atoms; R2 is a hydrogen atom or -Py-(Py: pyridyl group); R3 is a hydrogen atom, —C(R5)=N—R4 or —CH(R5)-N(R6)-R4; R4 is an alkyl group having 1 to 18 carbon atoms, —CH$_2$-Py or —CH$_2$—CH$_2$—N(R6)-CH$_2$-Py (Py: pyridyl group); R5 is a hydrogen atom or a methyl group; R6 is a hydrogen atom or —R4; R7 and R8 are each an alkyl or alkenyl group having 1 to 4 carbon atoms; R9 is an alkyl group having 1 to 4 carbon atoms or —CH$_2$—CH$_2$—N(R8)-R7; and m is 1 or 2.

The present invention provides an ink containing at least the aforementioned pigment dispersion liquid.

Furthermore, the present invention provides an inkjet recording method including applying energy to an ink to cause the ink to fly, thereby applying the ink onto a recording medium, in which the ink is the ink of the present invention. In the recording method, the energy can be thermal energy.

Furthermore, the present invention provides an ink cartridge having an ink storage portion for storing ink, in which the ink is the ink of the present invention; and provides an inkjet recording apparatus having an ink cartridge having an ink storage portion storing an ink and a head portion for ejecting the ink, in which the ink is the ink of the present invention.

According to the present invention, a pigment dispersion liquid can be provided, which is improved in dispersion stability and capable of improving the storage stability and ejection stability of ink and which is to be used as ink capable of recording an image having high fastness and excellent quality stably for a long time. Furthermore, there are provided an ink capable of recording an image excellent in fastness and quality, an inkjet printing method, an ink cartridge and an inkjet recording apparatus.

Further features of the present invention will become apparent from the following description of exemplary embodiments with reference to the attached drawings.

BRIEF DESCRIPTION OF THE DRAWINGS

FIG. 1 is a schematic view illustrating the structure of an ink cartridge.

FIG. 2 is a schematic view illustrating the structure of an inkjet recording head.

DESCRIPTION OF THE EMBODIMENTS

Figure 3:
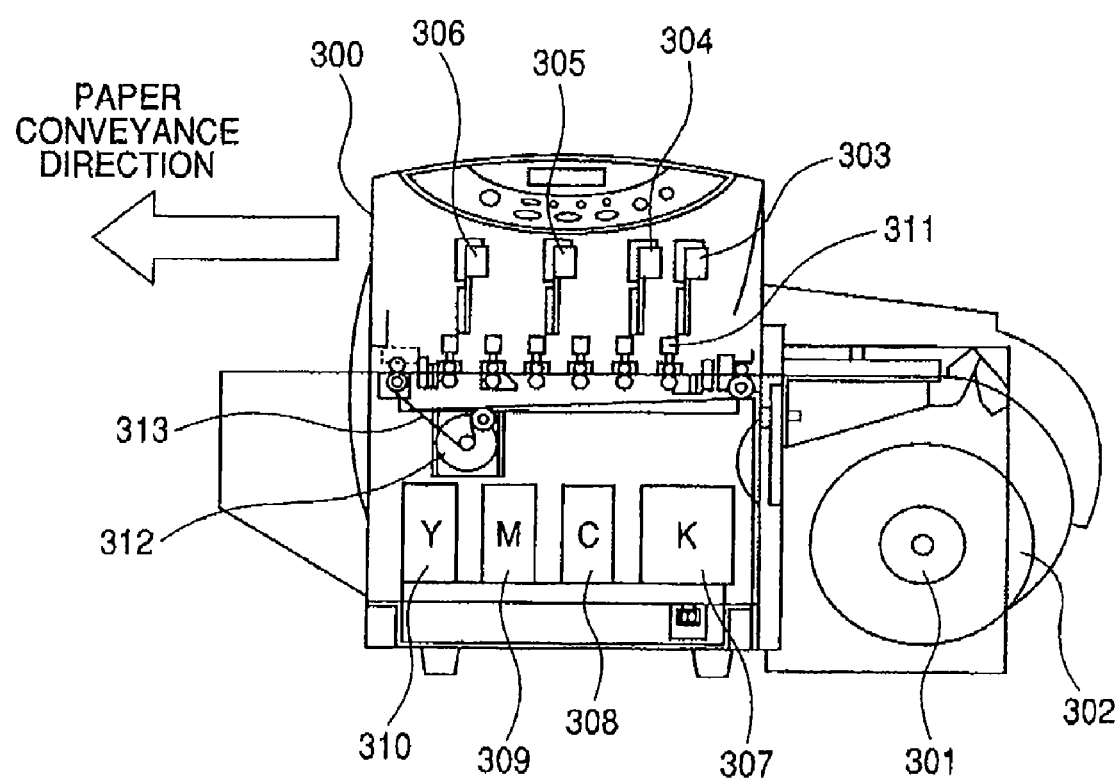
FIG. 3 is a perspective view of an inkjet recording apparatus.

The present invention will be described more specifically below.

The present inventors found that, in a pigment dispersion liquid mainly formed of a polymer dispersant, a coloring material and water, if the polymer dispersant is formed of at least a hydrophobic unit and a hydrophilic unit (the hydrophobic unit having a block portion formed of at least one hydrophobic monomer), and the coloring material is formed of a pigment having on its surface an anionic group; and a basic compound capable of forming a complex with an alkaline metal is further contained in the pigment dispersion liquid, it can be used as an ink capable of stably recording an image having high fastness and excellent quality.

Since the hydrophobic unit of the polymer dispersant contains a block portion formed of a hydrophobic monomer having a good affinity for a pigment, the polymer dispersant covers pigment particles to improve the stability of the pigment dispersion liquid. Furthermore, since a pigment having on its surface an anionic group is used, a partial aggregation of the pigment can be suppressed and long-term dispersion stability of the pigment can be obtained. Furthermore, in a general pigment covered with a polymer dispersant, the dispersant is liable to detach by external application of heat and shock and upon chemical influence. The exposed portion of pigment particles from which the dispersant is detached becomes strongly hydrophobic. As a result, aggregation of the pigment particles is facilitated and the dispersion stability of the pigment particles rapidly decreases. Whereas, the present invention employs a pigment having an anionic group on the surface. Therefore, even if a dispersant is detached, a basic compound contained in the dispersant liquid of the present invention is immediately associated with the anionic group exposed on the surface of the pigment, suppressing the aggregation of pigment particles. Furthermore, the anionic group to be employed in the present invention present on the pigment surface has an acid form. Therefore, the hydrophobicity of the pigment-particle surface increases, and enhances the affinity between the pigment particle surface and the hydrophobic portion of the polymer dispersant. In this way, the pigment particles can be easily covered with the dispersant. Moreover, since the anionic group of the pigment surface has an acid form, the affinity between a basic compound and the anionic group on the pigment surface increases, with the result that the effect of improving dispersion stability is further augmented. On the other hand, in the case where the basic compound is an amine compound having 2 to 4 nitrogen atoms, the affinity of the pigment surface with anionic group further increases. In addition, the affinity between the amine compound and a hydrophobic portion of a polymer dispersant increases and the pigment particles are tightly covered with a polymer dispersant. Because of this, the stability of the polymer dispersion liquid is further improved.

As a component of a pigment dispersion liquid according to the present invention, a basic compound capable of forming a complex with an alkaline metal is used. When an alkaline metal is excessively present in a pigment dispersion liquid, when a highly reactive alkaline metal is present, and when the surface coverage state of pigment particles with a polymer dispersant is uniform, the basic compound forms a complex with an alkaline metal, suppressing the reactivity of the alkaline metal. Therefore, no neutralization occurs. This means that the adsorption to a pigment of the polymer dispersant does not decrease. On the other hand, if a pigment is unevenly covered with the polymer dispersant or has an exposed portion from which the polymer dispersant is detached, an anionic group (such as a carboxyl group) exposed on the pigment particle surface reacts with an alkaline metal ion of an alkaline metal forming a complex with a basic compound and is neutralized to repair the dispersibility of the exposed portion of the pigment. In this way, long-term pigment dispersion stability can be obtained. Furthermore, in a printed image, the encapsulation state of pigment particles is maintained, the fixability of ink and image fastness such as the scratch resistance can be further improved, compared to the case where a polymer dispersant is detached from pigment particles. The effect is further improved in the case where the hydrophobic unit of a polymer dispersant has a block portion having a specific structure containing an aromatic hydrocarbon group.

Furthermore, in the present invention, since a copolymer whose hydrophilic unit has a repeating unit structure of an acrylic amide structure represented by the following general formula (1) is used as a dispersant, the affinity for water serving as a dispersion medium for the dispersant is improved. In this way, the dispersion stability of a pigment is further improved, and long-term storage stability and ejection stability of ink are improved.

General formula (1)

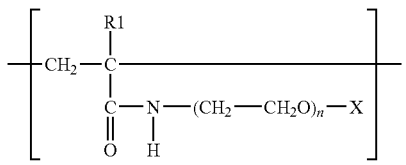

where R1 represents a hydrogen atom or a methyl group; X represents a hydrogen atom or an alkyl group having 1 to 4 carbon atoms; and n is 1 to 10.

Furthermore, the acrylamide structure has a good affinity for the basic compound contained in the dispersion liquid of the present invention. Therefore, in the case where the basic compound is an amino compound having 2 to 4 nitrogen atoms, the basic compound coordinates between a pigment and a polymer dispersant to improve the affinity between them. As a result, the pigment particles are stably covered with the polymer dispersant. The effect is more effectively obtained when the basic compound has a structure where nitrogen atoms are mutually connected via two consecutive carbon atoms interposed between them, in consideration of the molecular-structure correspondency to the polymer dispersant. In addition, in the case of the structures represented by the above general formulas (3) to (6), the affinity of the basic compound itself for pigment particles improves and the pigment particles are covered more uniformly.

Since the hydrophilic unit of the general formula (1) in the polymer dispersant covering the surface of a pigment has an ethylene oxide structure having an affinity for water and an aqueous organic solvent contained in ink, the hydrophilic unit of the polymer dispersant partly permeates into a recording medium and adsorbs to an inorganic pigment and paper fibers present in the recording medium. The pigment whose surface is covered with the polymer dispersant remains on the surface without permeating into the recording medium. Therefore, the image density and the degree of ink bleeding do not get worse. Furthermore, by the presence of an amide structure of the unit, adhesiveness between the pigment and the recording medium after drying of ink increases, and the fastness such as fixability of ink and scratch resistance of an image improves. These effects may further be improved by constructing each of the structures in the form of a block.

Because of these effects, excellent image fastness and fixability of ink can be attained without a decrease of image density, and stability of ink during a long-time storage can be improved. At the same time, even in the case where the ink composition greatly changes, like thickening of ink at the tip of a nozzle when the ink is used in an inkjet apparatus, ink can be stably ejected without decreasing the dispersion stability of a pigment. Furthermore, in an inkjet apparatus having a line head where recovery operation of an inkjet nozzle by cleaning cannot be frequently performed, the deposition of ink onto the peripheral portion of the nozzle can be suppressed, with the result that ejection failure of ink and dot misalignment rarely occur and continuous-printing performance can be satisfactorily attained for a long time.

Composition materials of a pigment dispersion liquid according to the preset invention will be described more specifically, below.

<Polymer Dispersant>

The polymer dispersant to be used in the present invention is a copolymer formed of at least a hydrophilic unit and a hydrophobic unit. The hydrophobic unit has a block portion formed of at least one hydrophobic monomer. The hydrophilic unit has a repeating unit structure of an acrylamide structure represented by the following general formula (1):

General formula (1)

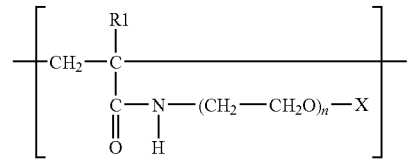

where R1 represents a hydrogen atom or a methyl group; X represents a hydrogen atom or an alkyl group having 1 to 4 carbon atoms and preferably a hydrogen atom or a methyl group; and n is 1 to 10 and preferably 1 to 6.

It is desirable that the number of repeating units (of the above monomer structure) is 10 to 200, preferably 20 to 150, and more preferably 20 to 100, because the dispersion stability of a pigment and fixability of ink on a recording medium are improved.

As the monomer to be used for forming the structure of the general formula (1) above, for example, mention may be made of N-(2-hydroxyethyl)acrylamide, N-(2-(2-hydroxyethoxy)ethyl)acrylamide, N-(2-(2-(2-hydroxyethoxy)ethoxy)ethyl)methacrylamide, N-(methoxyethyl)acrylamide, N-(2-(2-ethoxyethoxy)ethyl)acrylamide, N-(2-(2-(2-butoxyethoxy)ethoxy)ethyl)methacrylamide and N-(2-(2-(2-(2-(2-methoxyethoxy)ethoxy)ethoxy)ethoxy)ethyl)methacrylamide. These can be used singly or in combination of two or more of them.

As the hydrophobic unit of a polymer dispersant, any hydrophobic unit may be used as long as it has a block portion formed of at least one hydrophobic monomer. In the case where two or more types of hydrophobic monomers are contained, as long as the block portion is formed of hydrophobic monomers alone, these hydrophobic monomers can be present at random or as a block. However, preferably, it is desirable that the hydrophobic monomers are present as a block, because a stable encapsulated pigment can be formed. As a repeating unit of a hydrophobic monomer of a block portion formed of hydrophobic monomers, in the case where two or more types of hydrophobic monomers are present, it is desirable that the total number of repeating units of the hydrophobic monomers is 10 to 200, preferably 20 to 150, and more preferably 20 to 100. This is because the affinity between a dispersant and a pigment becomes satisfactory. Furthermore, it is desirable that the ratio of the number (a) of hydrophobic-monomer repeating units to the number (b) of monomer-structures represented by the general formula (1), i.e. a/b, is 0.1 to 10, and preferably 0.5 to 5, because not only the dispersion stability of a pigment but also fixability of ink onto a recording medium improves.

As the hydrophobic monomer, any hydrophobic monomer can be used as long as it can be copolymerized with a monomer having an acrylamide structure forming a hydrophilic unit. In particular, a vinyl monomer having a hydrophobic substituent can be used. Of them, a monomer forming a repeating unit structure represented by the general formula (2) below is desirable, because the affinity between a pigment and a dispersant is further improved and a stable encapsulated pigment can be formed.

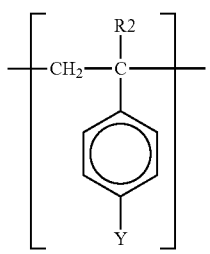

General formula (2)

where R2 represents a hydrogen atom or a methyl group; Y represents —R3, —OR3 or —COOR3 in which R3 represents an alkyl group having 1 to 18 carbon atoms.

Examples of such a monomer may include 1-methyl-4-vinylbenzene, 1-ethyl-4-(propen-2-yl)benzene, 1-butyl-4-(propen-2-yl)benzene, 1-dodecyl-4-(propen-2-yl)benzene, 4-methoxy-vinylbenzene, 4-butoxy-vinylbenzene, methyl-4-vinylbenzoate, butyl-4-vinyl benzoate, dodecyl-4-vinylbenzoate, hexadecyl-4-vinylbenzoate and octadecyl-4-vinylbenzoate. These can be used singly or in combination of two or more of them.

Furthermore, as long as a hydrophilic unit contains a monomer unit having a structure represented by the general formula (1) above, the hydrophilic unit may contain another monomer structure having a hydrophobic substituent and a hydrophilic substituent. In particular, a monomer structure having a hydrophilic substituent can be used because the dispersion stability of a pigment is improved. As the monomer having another monomer structure, a monomer having an anionic group as a hydrophilic substituent can be used because the dispersion stability improves. For example, acrylic acid, methacrylic acid, crotonic acid, maleic acid, fumaric acid, styrene sulfonic acid, styrene carboxylic acid, and mono-(2-acryloyloxy-1-methyl-ethyl)phthalate may be mentioned. Of them, acrylic acid and methacrylic acid can be used in view of polymerizability. These can be used singly or in combination of two or more of them. In this case, it is desirable that the hydrophilic unit is formed of a block portion which is formed of a repeating unit structure represented by the general formula (1), and a block portion which is formed of a segment having an anionic group. This is because the fixability of ink onto a recording medium becomes satisfactory. In particular, it is more desirable that the polymer dispersant is at least formed of a block portion which is formed of a repeating unit structure represented by the general formula (2), a block portion which is formed of a repeating unit structure represented by the general formula (1), and a block portion which is formed of a segment having an anionic group, in this order. This is because the most excellent dispersion stability of a pigment and the most excellent fixability of ink on a recording medium can be obtained.

Note that when a monomer having an anionic group is polymerized to obtain a desired hydrophilic unit, the degree of polymerization can be enhanced by esterifying a carboxyl group of the monomer to prepare a monomer compound, polymerizing the monomer compound, and then performing hydrolyzation.

The polymer dispersant to be used in the present invention can be obtained by polymerizing the aforementioned monomers using a customary polymerization method such as radical polymerization and anionic polymerization. In particular, a living radical polymerization method is desirably used. By use of the living radical polymerization method, copolymers and block copolymers having a uniform molecular weight can be manufactured. These polymer dispersants preferably have a weight average polymer weight ranging from 3,000 to 50,000, and more preferably from 5,000 to 30,000. The polymer dispersant obtained is identified by qualitatively and quantitatively analyzing functional groups by NMR, IR and chromatographic analyses.

When a polymer dispersant has an anionic group, the acid value of the polymer dispersant is desirably from 10 to 150 mgKOH/g, more preferably 30 to 100 mgKOH/g, in view of fixability and color development property of ink. Furthermore, the anionic group of the polymer dispersant needs to be neutralized with alkali; however, a polymer dispersant containing un-neutralized anionic groups can be used. It is desirable that the degree of neutralization is preferably 50 to 100 mol %, and more preferably 80 to 100 mol %. This is because ejection properties of ink virtually do not deteriorate. The anionic group may be neutralized either before or after polymerization. More specifically, vinyl monomers containing an anionic group can be neutralized with alkali before polymerization or the vinyl monomers containing an anionic group can be polymerized before neutralization with alkali. However, a method of polymerizing monomers before neutralization can be desirably used. Note that the acid value of a polymer dispersant in this invention is measured in accordance with the acid value measurement method specified by the Japanese Industrial Standard (JIS)-K0070.

As the alkali to be used for neutralizing a polymer dispersant and ink, alkaline metals may be mentioned including lithium, sodium and potassium. Particularly, potassium is preferably used since ejection properties of ink improve. Specific examples thereof may include potassium hydroxide, sodium hydroxide, lithium hydroxide, potassium carbonate, sodium carbonate and lithium carbonate.

The content of a polymer dispersant in a pigment dispersion liquid is preferably 0.5 to 30% by mass based on the total mass of the pigment dispersion liquid, and more preferably 1.0 to 20% by mass. The content of a polymer dispersant in ink is preferably 0.1 to 15% by mass based on the total mass of the ink, and more preferably 0.5 to 10% by mass.

<Pigment>

The pigment to be used as a coloring material in the present invention is a pigment having an anionic group (a carboxylic group or a sulfonic acid group) on its surface. The pigment is generally obtained by treating the surface of a commercially available pigment sold as an untreated pigment (no surface treatment is applied) with a known oxidizing agent such as persulfate, or by attaching an anionic group to the surface by a sulfonation treatment. In the present invention, it is preferred that such a pigment is previously treated with acid such that the anionic group has an acid form to render the pigment to be insoluble in water. Such an acid treatment improves the affinity between a pigment and a polymer dispersant, and consequently, an encapsulated pigment formed of the pigment and the polymer dispersant can be formed stably. Note that the anionic group on the surface of a pigment can be identified by a known analytic method such as IR, NMR and element analysis.

The pigment treated with acid as mentioned above can be easily produced by dispersing a pigment having an anionic group on the surface in water or an aqueous solvent, adding an acid and adjusting pH. The acid to be used is not limited. For example, any substance can be used as long as it generates hydrogen ions in the presence of water, such as hydrochloric acid, sulfuric acid, phosphoric acid, nitric acid and acetic acid, further aluminum chloride and zinc chloride.

The pH range for the acid treatment for a pigment having an anionic group on its surface is not limited as long as the anionic group (on the surface of the pigment) acquires an acid form in the pH range. In consideration of a pigment collecting step performed later, the range of pH is preferably 1 to 5 where pigment particles are easily aggregated and precipitated, and further preferably 1 to 3. The pigment treated with acid can be easily collected by filtration or centrifugal precipitation. However, a collection method is not limited to these.

The content of a pigment in a pigment dispersion liquid according to the present invention is preferably 0.5 to 30% by mass based on the total mass of the pigment dispersion liquid, and more preferably 1.0 to 20% by mass. The content of a pigment in ink is preferably 0.1 to 15% by mass based on the total mass of the ink, and more preferably 0.5 to 10% by mass. If the content of a pigment in ink is less than 0.1% by mass, a sufficient image density may not be obtained. If the content of a pigment exceeds 20% by mass, ejection stability may be decreased by clogging etc. in a nozzle. Furthermore, it is desirable that the content ratio of a pigment to a polymer dispersant is preferably 10:1 to 1:3 in terms of solid mass ratio, and more preferably 5:1 to 1:2, in view of fixability of ink, image fastness, ejection stability and storage stability of ink. Note that these pigments can be singly used or in combination of two or more of them.

The average particle size of a pigment as mentioned above, which is obtained based on measurement by a laser particle-size analysis system, preferably falls within the range of 20 to 200 nm, more preferably 50 to 150 nm. When the average particle size is excessively small, the density of an image formed by ink decreases. On the other hand, when the average particle size is excessively large, the ejection stability of ink from a nozzle may decrease.

As the pigment to be used in the present invention, either an organic pigment or an inorganic pigment may be used. As the pigment to be used in ink, a black pigment and three primary color pigments of cyan, magenta and yellow can be used. Note that, color pigments other than those mentioned above, colorless or light color pigments and metallic luster pigments and the like may also be used. Furthermore, newly synthesized pigments may also be used for the present invention.

<Basic Compound>

As the basic compound to be used as an additive in the present invention, a basic compound capable of forming a complex with an alkaline metal in a pigment dispersion liquid or ink is used, and preferably a basic compound containing a nitrogen element is used. In the present invention, to suppress aggregation of pigment particles caused by detachment of a polymer dispersant from an encapsulated pigment, a pigment having at least an anionic group on its surface is used. However, neutralization of the anionic group on the surface of the pigment with an alkaline metal in ink is suppressed by the presence of a basic compound. The encapsulation state of a pigment is protected by addition of the basic compound. Furthermore, even if a polymer dispersant is detached from a pigment, an anionic group, such as a carboxylic group, exposed on the surface of a pigment particle reacts with an alkaline metal ion of an alkaline metal forming a complex with a basic compound and is neutralized. In this way, dispersibility of the exposed portion of the pigment is repaired and thereby the stable dispersion state of a pigment within ink can be maintained. Furthermore, the basic compound to be used in the present invention has a strong interaction such as a hydrogen bond with an acrylamide bond contained in a hydrophilic unit (represented by the general formula (1)) of the polymer dispersant of the present invention. As a result, fixability of ink onto a recording medium after printing and fastness such as scratch resistance of an image are effectively improved. In particular, the case where the basic compound is an amine compound having 2 to 4 nitrogen atoms is preferred, because the effect of preventing aggregation of pigment particles, which is caused by detachment of a polymer dispersant from an encapsulated pigment, improves.

Furthermore, the basic compound is preferably an amine compound having 2 to 4 nitrogen atoms, and further preferably an amine compound having a structure in which nitrogen atoms are mutually connected via two consecutive carbon atoms interposed between them. This is because if the —N—C—C—N— structure is present in the compound structure, the effect of preventing aggregation of pigment particles (caused by detachment of a polymer dispersant from an encapsulated pigment) is further improved. Particularly, such nitrogen atoms of the basic compound have a strong interaction with an acrylamide bond (as shown in the general formula (1)) of a polymer dispersant and contributes to forming a stable structure, in which the polymer dispersant is crosslinked with the nitrogen atoms present in the basic compound. In particular, it is desirable to have an —N—C—C—N— structure (in which nitrogen atoms are mutually connected via two consecutive carbon atoms interposed between them), because the —N—C—C—N-structure and the structure represented by the general formula (1) have a proper size relationship with respect to the molecular structure, with the result that the stability of a capsule of a polymer dispersant is further improved. As the basic compound having a structure in which nitrogen atoms are mutually connected via two consecutive carbon atoms interposed between them, a basic compound having any one of the structures represented by the following general formulas (3) to (6) can be used. Since these basic compounds have an appropriate hydrophobicity, by which the basic compound is appropriately associated with pigment particles, the binding force between the polymer dispersant and the pigment particles can be further improved.

General formula (3)
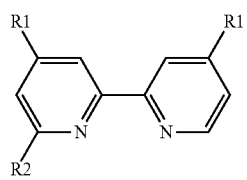

General formula (4)
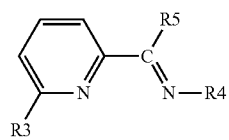

General formula (5)
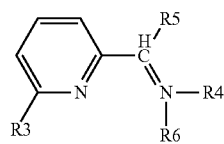

General formula (6)
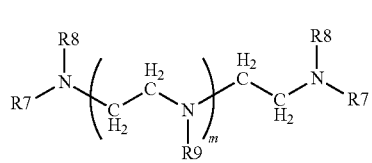

where R1 represents a hydrogen atom or an alkyl group having 1 to 18 carbon atoms; R2 is a hydrogen atom or -Py-R1 (Py: pyridyl group); R3 is a hydrogen atom, —C(R5)=N—R4 or —CH(R5)-N(R6)-R4; R4 is an alkyl group having 1 to 18 carbon atoms, —CH$_2$-Py or —CH$_2$—CH$_2$—N(R6)-CH$_2$-Py (Py: pyridyl group); R5 is a hydrogen atom or a methyl group; R6 is a hydrogen atom or —R4; R7 and R8 are each an alkyl group or an alkenyl group having 1 to 4 carbon atoms; R9 is an alkyl group having 1 to 4 carbon atoms or —CH$_2$—CH$_2$—N(R8)-R7; and m is 1 or 2.

As specific examples of the basic compound to be used in the present invention, compounds represented by the following formulas may be mentioned. Needless to say, derivatives thereof can be used. Note that these basic compounds may be used singly and in combination of two or more of them.

I-a
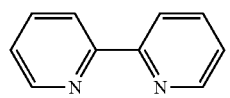

I-b
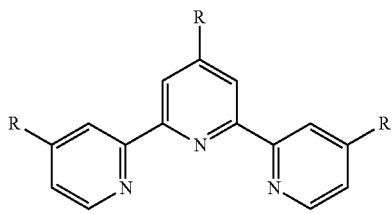

I-c
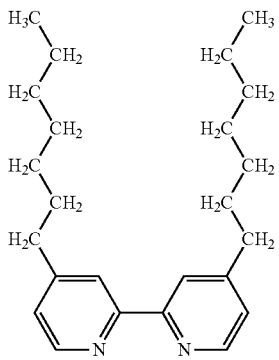

I-d
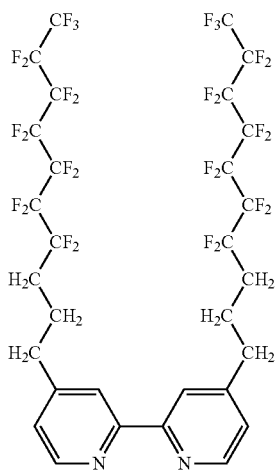

I-e
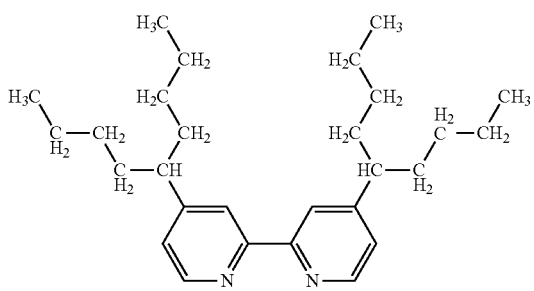

II-a
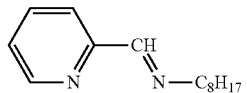

II-b
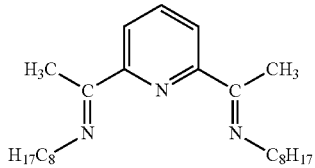

-continued

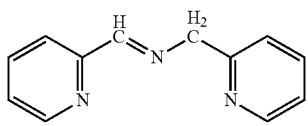
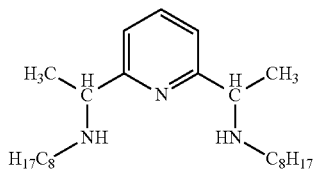
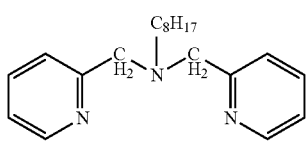
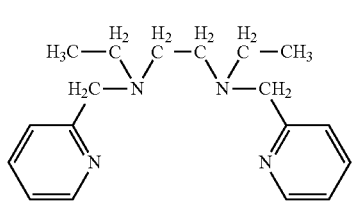
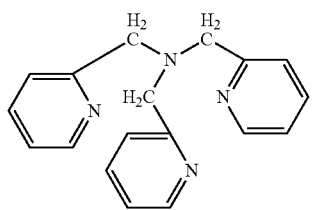
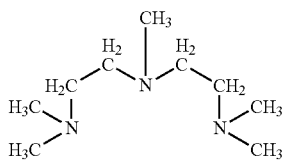
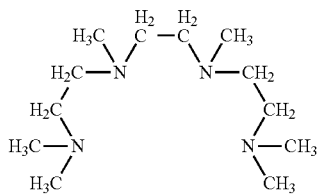
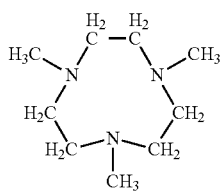

II-c

III-a

III-b

III-c

III-d

IV-a

IV-b

IV-c

-continued

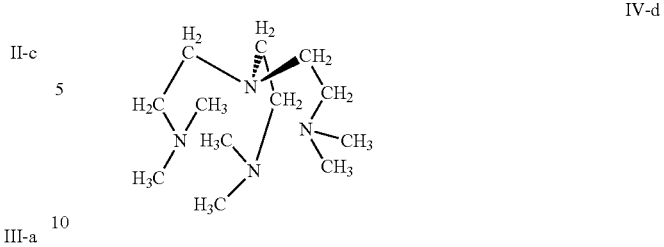

IV-d

The contents of these basic compounds in a pigment dispersion liquid will be discussed. It is desirable that the molar ratio of a starting basic compound (L) relative to a starting polymer dispersant (P), i.e. L/P, is larger than 0.01 and less than 100, preferably larger than 0.05 and less than 50, and more preferably larger than and less than 20. This is because the storage stability of the pigment dispersion liquid improves. When the ratio L/P is larger than the aforementioned range, a basic compound is added excessively and the effect of neutralizing an acid form pigment with an alkaline metal decreases. Furthermore, the degree of affinity of a basic compound for a polymer dispersant becomes excessively high and the affinity between dispersed particles increases. Instead, the storage stability of a pigment dispersion liquid may decrease. On the other hand, when the content of a basic compound is lower than the aforementioned range, an alkaline metal complex with a basic compound is not formed sufficiently. In addition, the protection effect of an anionic group and the effect of a polymer dispersant for stabilizing a capsule decrease, with the result that the storage stability of a pigment dispersion liquid (ink) may decrease. Furthermore, an alkaline metal which does not form a complex with a basic compound facilitates detachment of a polymer dispersant from the surface of a pigment and may adversely affect the fixability of ink on a recording medium after printing.

A basic compound may be added to a pigment dispersion liquid after a dispersion liquid containing a pigment and a polymer dispersant is prepared, added when dispersion particles are formed of a pigment and a polymer dispersant, or added to a polymer dispersant in advance, for example, added when the polymer dispersant is synthesized.

Water serving as a dispersion medium of a pigment dispersion liquid according to the present invention may include, but not particularly limited to, tap water, deionized water, ion exchanged water and pure water. Of them, ion exchange water is preferred. The use amount of water is appropriately set such that a pigment concentration falls within the aforementioned range.

<Organic Solvent>

The materials mentioned above are the main components of a pigment dispersion liquid according to the present invention. Other than these materials, a water-soluble organic solvent can be used appropriately. Examples of the organic solvent that can be used in a pigment dispersion liquid according to the present invention include water-soluble organic solvents. A solvent mixture of two or more types of water-soluble organic solvents can be used. Specific examples of the water-soluble organic solvent that can be used include lower alcohols such as methyl alcohol, ethyl alcohol, n-propyl alcohol, isopropyl alcohol, n-butyl alcohol, sec-butyl alcohol and tert-butyl alcohol; diols such as ethylene glycol, diethylene glycol, triethylene glycol, tetraethylene glycol, propylene glycol, dipropylene glycol, tripropylene glycol, 1,2-butane diol, 1,3-butane diol, 1,4-butane diol, thiodiglycol and 1,4-cyclohexane diol; triols such as 1,2,4-butane triol, 1,2,6-hexane triol and 1,2,5-pentane triol; hindered alcohols such as trimethylolpropane, trimethylolethane, neopentyl glycol and pentaerythritol; glycol ethers such as ethylene glycol monomethyl ether, ethylene glycol monoethyl ether, ethylene glycol monoisopropyl ether, ethylene glycol monoallyl ether, diethylene glycol monomethyl ether, diethylene glycol monoethyl ether, diethylene glycol monobutyl ether, triethylene glycol monomethyl ether, triethylene glycol monoethyl ether, propylene glycol monomethyl ether and dipropylene glycol monomethyl ether; glycerin, dimethylsulfoxide, glycerin monoallyl ether, polyethylene glycol, N-methyl-2-pyrrolidone, 2-pyrrolidone, γ-butyrolactone, 1,3-dimethyl-2-imidazolidinone, sulfolane, β-dihydroxyethyl urea, urea, acetonyl acetone, dimethyl formamide, dimethyl acetamide, methyl ethyl ketone, acetone and diacetone alcohol.

A pigment dispersion liquid according to the present invention is obtained by dispersing a pigment in water with the aid of the polymer dispersant in accordance with a known pigment dispersion technique in the art. A manufacturing method that can be used is as follows. The polymer dispersant is dissolved desirably in an organic solvent such as methylethyl ketone, acetone, methanol, ethanol and tetrahydrofuran to obtain a solution (concentration: 1 to 30% by mass). The solution and the pigment are mixed in the aforementioned ratio on a solid basis and sufficiently kneaded to disperse the pigment; then, particles of the pigment are covered with the polymer dispersant. Thereafter, the solvent is distilled off. The resultant mixture is formed into flakes, sheets or powder, which is added to an appropriate amount of water containing an appropriate amount of alkaline substance and stirred to obtain the pigment dispersion liquid of the present invention.

The ink of the present invention is obtained by mixing the pigment dispersion liquid and at least a water-soluble organic solvent in accordance with a customary method. As the water-soluble organic solvent to be used in the present invention, those mentioned for the pigment dispersion liquid can be appropriately used. Of them, an aqueous organic solvent having a boiling point of 120° C. or more is preferably used since the thickening of ink at the tip of a nozzle is suppressed. The ratio of the water-soluble organic solvent to ink is preferably 5 to 50% by mass based on the total mass of ink, and more preferably 10 to 30% by mass.

Furthermore, when a pigment dispersion liquid and an aqueous organic solvent are mixed, if necessary, various types of additives such as water, a surfactant, a pH regulator, an antioxidant and an antifungal agent may be added. Moreover, the pH of ink is preferably adjusted to 8.0 to 10.0, and more preferably, 8.4 to 9.8. This is because long-term storage stability of ink is improved and a decrease of ejection properties of ink after the long-term storage is suppressed. As the pH regulator, an organic amine such as triethanolamine and a hydroxide of an alkaline metal such as lithium hydroxide, sodium hydroxide and potassium hydroxide, and an organic acid may be mentioned.

An inkjet recording method according to the present invention for recording an image by applying energy to ink to cause it to fly is characterized by using the ink of the present invention. As the energy, thermal energy and mechanical energy can be used; however, thermal energy is preferably used.

In the inkjet recording method of the present invention, examples of the recording medium that are preferably used may include, but is not particularly limited to, so-called exclusive inkjet recording paper, paper used as post cards and name cards, labeling paper, corrugated paper, inkjet film and copier paper sheets. As a recording medium having a coating layer, a recording medium having an ink receiving coating layer on at least one of the surfaces containing at least a hydrophilic polymer and/or an inorganic porous material is desirable.

As an inkjet recording apparatus for recording an image by use of the ink of the present invention, mention may be made of a general printer for family uses mainly using A4 size paper sheets, a single-purpose printer for cards such as name cards, and a large-scale printer for professional uses. Of them, a preferable inkjet recording apparatus will be described below.

<Inkjet Recording Apparatus Using Thermal Energy>

FIG. 1 shows an ink cartridge 100 containing ink, which is to be supplied to a head by way of an ink-supply tube 104. An ink pouch 101 containing supply ink has a plug 102 made of a chlorinated butyl rubber at the top. A needle 103 can be inserted into the plug 102 to supply the ink of the ink pouch 101 to recording heads (303 to 306). Furthermore, the ink cartridge may have an ink absorber for receiving waste ink. The inkjet recording apparatus of the present invention is not limited to the aforementioned apparatus in which a recording head and an ink cartridge separately installed. An apparatus having them integrated therein can be appropriately used.

FIG. 2 is a schematic view illustrating the structure of the inkjet recording head used in an example of the present invention. Nozzles 202 have the corresponding heaters 204 provided thereto. When a predetermined driving pulse is applied to the heaters 204 from a recording head driving circuit, the heaters generate heat to produce air bubbles. The air bubbles work to eject ink droplets from ejection ports 202. Note that the heaters 204 are formed on a silicon substrate 206 in the same procedure as in a semiconductor manufacturing process. Individual nozzles 202 are separated by partition walls 203. Ink is supplied from a common liquid chamber 205 to each of the nozzles 202 and a top plate 207 is provided above the chamber.

FIG. 3 shows a segmentary perspective view illustrating a recording apparatus according to an example of the present invention. The recording paper 302 of a recording apparatus 300 is fed from, for example, a roll supply unit 301 and conveyed by a conveyance unit provided in the main body of the recording apparatus 300 in a continuous manner. The conveyance unit is formed of a conveyance motor 312 and a conveyance belt 313, etc. When the image starting position of the recording medium passes under a black-ink recording head 303, ejection of black ink starts from the recording head. Similarly, cyan 304, magenta 305 and yellow 306 are sequentially and separately ejected in this order to form a color image.

Other than these structural elements, the recording apparatus 300 has a cap mechanism 311 for providing a cap on each recording head during the stand-by period, ink cartridges 307 to 310 for supplying ink respectively to the recording heads 303 to 306, a pump (not shown) unit for supplying ink and conducting recovery operation, and a control board (not shown) for controlling the entire recording apparatus.

Figure 4:
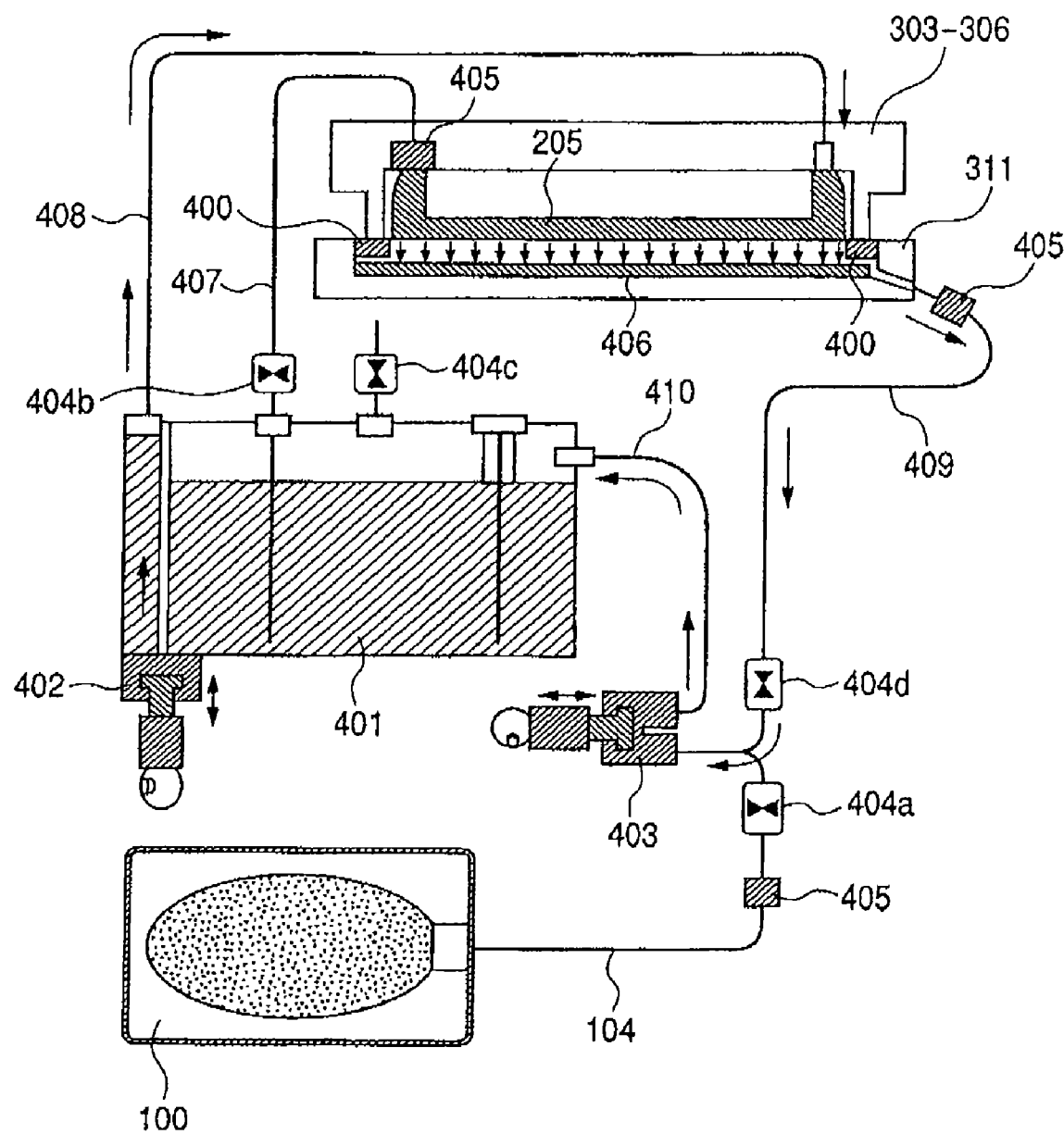
FIG. 4 is a schematic view of a recovery system of the inkjet recording apparatus.

FIG. 4 is a schematic view of a recovery system of the inkjet recording apparatus used in an example of the present invention. When the recording head (303 to 306) moves down and its ink ejecting port forming surface comes closer to a cap 400 formed of a chlorinated butyl rubber and placed within the cap mechanism 311, a predetermined recovery operation can be carried out.

The recovery system has an ink recycling circuit, which primarily has, an ink cartridge 100 housing a polyethylene pouch storing ink to be supplied; a sub tank 401, connected via a suction pump 403, etc.; the suction pump 403, which is provided to an ink supply channel 409 formed of a vinyl chloride and connects between the cap 400 and the sub tank 401, used for collecting ink from the cap mechanism 311 into the sub tank 401; and a filter 405 for removing dusts in the ink collected from the cap mechanism; a booster pump 402, which is connected by way of an ink supply channel 408 and used for supplying ink to the common liquid chamber of the recording heads 303 to 306; an ink supply channel 407 for supplying the ink returned from the recording heads to the sub tank 401; and valves 404a to 404d.

At the time of cleaning the recording heads 303 to 306, the recovery valve 404b is closed and the booster pump 402 is actuated to apply pressure to ink and supply it from the sub tank 401 to the recording head to compulsively discharge the ink from the nozzle 406. In this way, bubbles, ink and dusts, etc., are discharged from the nozzles of the recording heads. The suction pump 403 is actuated for collecting the ink discharged from the recording heads into the cap mechanism 311 into the sub tank 401.

<Inkjet Recording Apparatus Using Mechanical Energy>

Next, an inkjet recording apparatus using mechanical energy that can be used herein will be described. As an example thereof, an on-demand inkjet recording apparatus may be mentioned, which has a nozzle-forming substrate having a plurality of nozzles, pressure generating elements, which are formed of a piezoelectric material and a conductive material and arranged so as to face the nozzles, and ink filling around the pressure generating elements. In the apparatus, when voltage is applied, the pressure generating elements are displaced to eject ink droplets from the nozzles. As a main portion of the recording apparatus, that is, a recording head, is shown in FIG. 5.

The head has an ink channel 80 communicating with an ink chamber (not shown); an orifice plate 81 for ejecting ink droplets of a desired volume; a vibration plate 82 for applying pressure directly to ink; a piezoelectric element 83 arranged in contact with the vibration plate 82 and displaces in accordance with an electric signal; and a substrate 84 for supporting and fixing the orifice plate 81 and the vibration plate 82.

Figure 5:
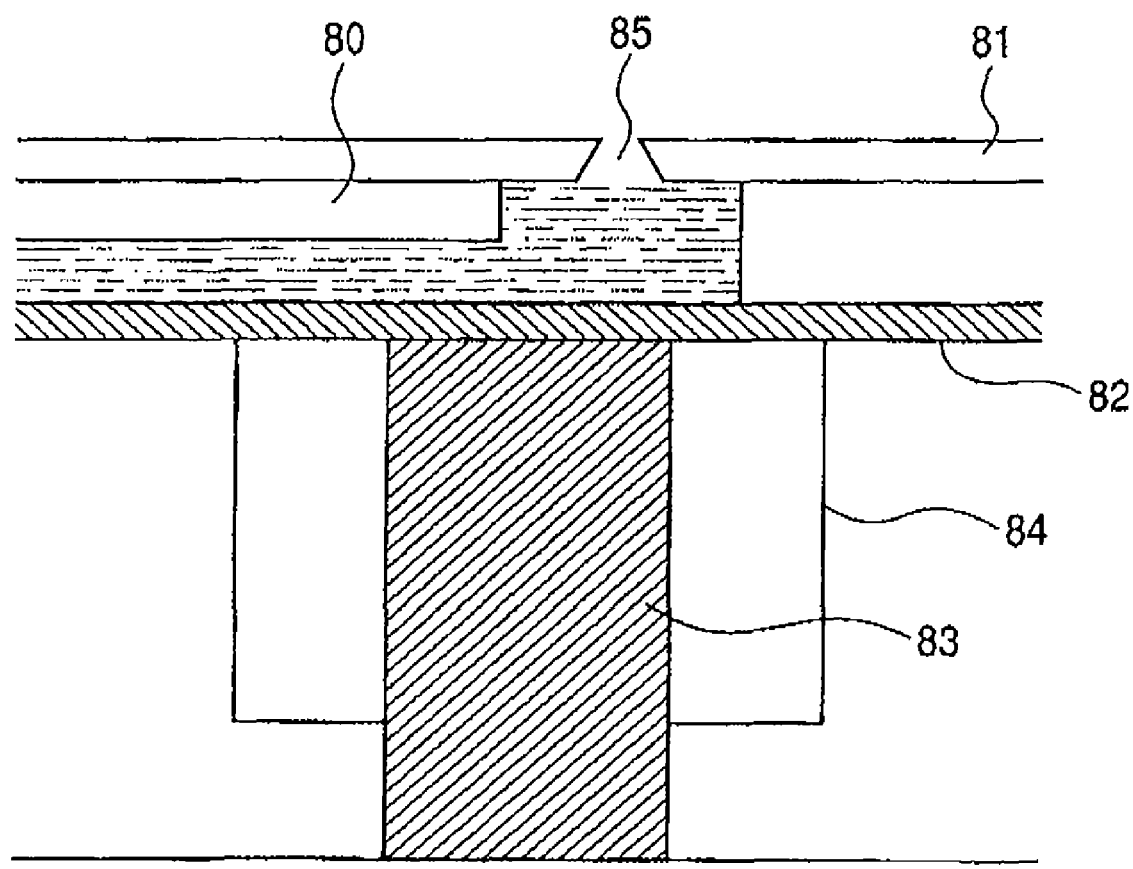
FIG. 5 is a schematic sectional view illustrating another structure of the inkjet recording head.

In FIG. 5, the ink channel 80 is formed of e.g., a photosensitive resin. The orifice plate 81 is formed of a metal such as stainless steel and nickel and has an ejection port 85 formed by electrocasting or press working. The vibration plate 82 is a film formed of a metal such as stainless steel, nickel and titanium, or a high elastomeric resin film. The piezoelectric element 83 is formed of a dielectric material such as barium titanate and PZT. The recording head having the aforementioned structural elements is operated as follows. When a pulse voltage is applied to the piezoelectric element 83, distortion stress is generated. When the energy is applied to the vibration plate 82 in contact with the piezoelectric element 83, the plate 82 deforms. The deformed plate 82 vertically pressurizes ink within the ink channel 80 to eject ink droplets (not shown) through the ejection port 85 of the orifice plate 81. In this manner, recording is performed.

EXAMPLES

The present invention will be described more specifically based on Examples and Comparative Examples, below. The present invention is not limited to these examples. Note that the "parts" and "%" in the description are represented on a mass basis, unless otherwise specified.

Furthermore, a polymer dispersant was identified by use of a nuclear magnetic resonance absorption apparatus (1H-NMR, ECA400 manufactured by JEOL Ltd., as a solvent, tetrahydrofuran-d8 was used) and GPC (HLC8220 manufactured by Tohso Corporation, as a column, TSK-GEL 4000HXL, TSK-GEL 3000HXL, TSK-GEL 2000HXL were used at a column oven temperature of 40.0° C.). Whether an alkaline metal is contained or not in a pigment dispersion liquid was determined by use of an ICP emission spectroscopic apparatus (SPS1700HV, manufactured by Seiko Instruments Inc.). Whether a complex is formed or not between a basic compound and an alkaline metal was checked by a capillary electrophoretic apparatus (CAPI-3300 manufactured by Otsuka Electronics Co., Ltd., the size of a capillary tube is 0.75 μm, temperature was set at 25° C.).

<Preparation of Polymer Dispersant A>

After a four-neck glass flask, which was equipped with a reflux tube, a funnel, a thermometer and a stirrer, was purged with nitrogen, the flask was charged with dimethylformamide (100 parts) and pentamethyldiethylenetriamine (0.5 parts). Subsequently, 1-methyl-4-vinylbenzene (36 mmol) as a hydrophobic monomer of a hydrophobic unit and chloroethylbenzene (1 mmol) as an initiator were added and heated while stirring. When the temperature of the reaction system reached 80° C., cuprous chloride (0.2 parts) was added to allow polymerization to initiate. In this manner, a block portion (component A) formed of the hydrophobic monomer of the hydrophobic unit was synthesized. The molecular weight thereof was monitored in a time division manner by gel permeation chromatography (GPC) to complete polymerization of component A.

Next, as a hydrophilic monomer forming an acrylamide structure represented by the general formula (1) above, N-(2-(2-hydroxyethoxy)ethyl)acrylamide (component B) (36 mmol) was added and polymerization was continued. The molecular weight was monitored by GPC in the same manner as above. After polymerization of component B was completed, methacrylic acid having an anionic group was caused to attach to the polymer by adding butyl methacrylate (20 mmol) (component C), which was previously synthesized by esterifying a hydrophilic moiety of methacrylic acid. After the polymerization was terminated, the ester moiety of component C was hydrolyzed by a solution of sodium hydroxide in methanol to obtain a carboxylic acid form, which was further purified to obtain a desired a triblock copolymer formed of components A, B and C (polymer dispersant A). The compound was identified by use of NMR and GPC. The weight average molecular weight (Mw) thereof was $1.1 \times 10^4$ and the ratio of the weight average molecular weight to the number average molecular weight (Mw/Mn) was 1.2. The acid value of the resultant polymer dispersant was measured and found to be 80 mgKOH/g. In this analysis, no basic compound was detected.

<Preparation of Polymer Dispersants B to F>

Polymer dispersants B to E were prepared in the same manner as in polymer dispersant A except that the type and addition amount of monomers of the hydrophobic unit and the hydrophilic unit were changed. However, in manufacturing polymer dispersant D, a mixture of monomer B and monomer C was added. In manufacturing polymer dispersant E, monomer C was not used and monomer B alone was added. On the other hand, polymer dispersant F, which was a random polymer having no block, was prepared by adding all monomers for forming a polymer simultaneously at the polymerization initiation time.

The types of monomers forming each of the polymer dispersants and the order of block portions are listed in Table 1. In addition, the number (a) of repeating units of block A and the number (b) of repeating units of block B, the weight average molecular weight and acid value of each of the polymer dispersants are listed in Table 2.

TABLE 1

| Polymer dispersant | Hydrophobic unit Type of monomer A | Hydrophilic unit Type of monomer B | Type of monomer C | The order of block portions |
|---|---|---|---|---|
| A | 1-Methyl-4-vinylbenzene | N-(2-(2-hydroxyethoxy)ethyl)acrylamide | Methacrylic acid | A-B-C |
| B | 1-Butyl-4-(propene-2-yl)benzene | N-(2-hydroxyethyl)acrylamide | Methacrylic acid | A-B-C |
| C | 1-Methyl-4-vinylbenzene | N-(2-hydroxyethyl)acrylamide | Maleic acid | A-B-C |
| D | 4-Methoxy-vinylbenzene | N-(2-(2-ethoxyethoxy)ethyl)acrylamide | Acrylic acid | A-(BC) A: block, BC: random |
| E | 1-Methyl-4-vinylbenzene | N-(2-hydroxyethyl)acrylamide | — | A-B |
| F | 1-Methyl-4-vinylbenzene | N-(2-(2-hydroxyethoxy)ethyl)acrylamide | Methacrylic acid | No blocks |

TABLE 2

| Polymer dispersant | (a)*[1] | (a/b)*[2] | Molecular weight Mw | Acid value (mgKOH/g) |
|---|---|---|---|---|
| A | 36 | 1 | $1.1 \times 10^4$ | 80 |
| B | 100 | 2 | $3.0 \times 10^4$ | 100 |
| C | 10 | 0.5 | $3.5 \times 10^3$ | 145 |
| D | 150 | 5 | $2.7 \times 10^4$ | 10 |
| E | 10 | 0.07 | $1.6 \times 10^4$ | — |
| F | — | — | $1.4 \times 10^4$ | 123 |

*[1](a); The number of repeating units of block A
*[2](a/b); The number of repeating units block A/the number of repeating units block B Next, a method of adding an anionic group to a pigment and a method of preparing an acid form anionic group used in the present invention will be described.

<Preparation of Pigment BK-1 by Addition of Anionic Group>

Commercially available carbon black (250 g) ("MA8", manufactured by Mitsubishi Chemical Corporation) was added to 1000 ml of ion exchange water (hereinafter referred to as "water"), and sufficiently stirred and dispersed. To the mixture, ammonium peroxodisulfate (1000 g) was added and stirred at 60 to 70° C. for 8 hours. The resultant slurry was filtrated by a ultrafiltration film (fraction molecular weight: 10000, manufactured by Toyo Roshi Kabushiki Kaisha) to remove salts until the conductivity of the filtrate reached 0.5 ms/cm or less. Furthermore, a solid substance was concentrated up to a concentration of 20%. To the resultant solution, 25% potassium hydroxide (20 g) was added dropwise to adjust pH of the dispersion liquid to 8. After the presence of a carboxyl group was analytically confirmed, water was added to the solution to adjust the solid substance concentration to 15%. In this way, pigment BK-1 having an anionic group on the surface was obtained. The average particle size thereof was 85 nm.

Then, the pigment having an anionic group was treated to obtain an acid form of the pigment by the following method.

<Preparation of Acid Form Black Pigment BK-2 by Acid Form Formation Treatment>

Pigment BK-1 obtained above (300 g) was stirred in a beaker. To the beaker, an aqueous 0.1N HCl solution was added dropwise to adjust the pH to 2. Thereafter, the mixture was centrifugally separated at 10,000 G. The pigment precipitates were collected and added to ion exchange water (200 g) separately prepared and stirred. After that, a centrifugal separation step was repeated in the same manner as above and the pigment precipitates was collected and dried at 60° C. under vacuum. Thereafter, it was analytically confirmed that the surface anionic group has an acid form. It was found that acid form pigment BK-2 powder was obtained.

<Preparation of Cyan Pigment CY-1 by Adding an Anionic Group>

The same procedure as above was repeated except that a commercially available cyan pigment: phthalocyanine blue "Fastgen blue TGR" (C.I. Pigment Blue 15:3, manufactured by DIC Corporation) was used. After analysis, it was found that pigment CY-1 obtained has an anionic group on the surface and has an average particle size of 65 nm.

<Preparation of Acid Form Cyan Pigment CY-2 by Acid Form Formation Treatment>

The same procedure as in preparation of BK-2 was repeated except that pigment CY-1 above was used. Thereafter, it was analytically confirmed that the surface anionic group has an acid form. It was found that acid form pigment CY-2 powder was obtained.

<Preparation of Magenta Pigment MG-1 by Adding an Anionic Group>

The same procedure as above was repeated except that a commercially available magenta: dimethylquinacridone "Fastgen super magenta RTS" (C.I. Pigment Red 122, manufactured by DIC Corporation) was used. As a result of analysis, pigment MG-1 obtained has an anionic group on the surface and an average particle size of 67 nm.

<Preparation of Acid Form Magenta Pigment MG-2 by Acid Form Formation Treatment>

The same procedure as in preparation of BK-2 was repeated except that pigment MG-1 above was used. Thereafter, it was analytically confirmed that the surface anionic group has an acid form. It was found that acid form pigment MG-2 powder was obtained.

<Preparation of Yellow Pigment YE-1 by Adding an Anionic Group>

The same procedure as above was repeated except that a commercially available yellow pigment: C.I. Pigment Yellow 128, manufactured by Clariant Co.) was used. As a result of analysis, it was found that pigment YE-1 obtained has an anionic group on the surface and an average particle size of 90 nm.

<Preparation of Acid Form Yellow Pigment YE-2 by Acid Form Formation Treatment>

The same procedure as in preparation of BK-2 was repeated except that pigment YE-1 above was used. Thereafter, it was analytically confirmed that the surface anionic group has an acid form. It was found that acid form pigment YE-2 powder was obtained.

Example 1

Preparation of Pigment Dispersion Liquid A1

A methylethyl ketone solution containing polymer dispersant A (10 g) mentioned above and coloring material BK-2 (10 g) were placed in a kneader having a twin screw and kneaded until they got homogeneous. Thereafter, the solvent was removed under vacuum while maintaining the inner temperature at 80° C. The kneaded product was formed into a sheet by use of two rollers. A predetermined amount of ion exchanged water and sodium hydroxide serving as a neutralizer (570 mg which corresponds to one equivalent of an anionic group of the polymer dispersant) were added, and pentamethyldiethylenetriamine was added as a basic compound, and stirred to obtain pigment dispersion liquid A1 having a pigment concentration of 10% by mass and a polymer dispersant concentration of 10% by mass. It was confirmed by a capillary electrophoresis measuring system that a complex between the basic compound and the alkaline metal is formed.

Examples 2 to 28

Preparation of Pigment Dispersion Liquids A2 to A28

Each of pigment dispersion liquids A2 to A28 was prepared in the same manner as in Example 1 except that a polymer dispersant, a coloring material and a basic compound were selected (changed) and the charge ratio of each of the components to the polymer dispersant (10 g) was changed. After the preparation, the concentration of the polymer dispersant in the pigment dispersion liquid was adjusted to 10% by mass. The details of pigment dispersion liquids A1 to A28 are shown in Table 3.

Comparative Examples 1 to 22

Preparation of Pigment Dispersion Liquids B1 to B22

Each of pigment dispersion liquids B1 to B22 were prepared in the same manner as in Example 1 except that a polymer dispersant, a coloring material and a basic compound were selected (changed) and the charge ratio of each of the compounds to the polymer dispersant (10 g) was changed. After the preparation, the concentration of the polymer dispersant in the pigment dispersion liquid was adjusted to 10% by mass. In Comparative Examples 1 to 8, no basic compound was used. In Comparative Examples 1, 2, 3, 12, 13, 19 and 20, as a polymer dispersant, a commercially available n-butyl-methacrylate-methacrylic acid block-copolymer (weight average molecular weight: 14,000), a styrene-maleic acid block-copolymer (weight average molecular weight: 11,000) and polyoxyethylene hexadecyl ether (weight average molecular weight: 26,000) were used. The details of pigment dispersion liquids B1 to B22 are shown in Table 4.

TABLE 3

| | Pigment dispersion liquid | Coloring material | Resin | Use amount P[mol] | Basic compound*1 | Use amount L [mol] |
|---|---|---|---|---|---|---|
| Ex. 1 | A1 | BK-2 | A | $9.1 \times 10^{-4}$ | Pentamethyldiethylenetriamine | $7.3 \times 10^{-2}$ |
| Ex. 2 | A2 | CY-2 | B | $3.3 \times 10^{-4}$ | 1,1,4,7,10,10-Hexamethyltriethylenetetramine | $1.1 \times 10^{-2}$ |
| Ex. 3 | A3 | MG-2 | C | $2.9 \times 10^{-4}$ | Pentamethyldiethylenetriamine | $5.3 \times 10^{-3}$ |
| Ex. 4 | A4 | YE-2 | D | $3.7 \times 10^{-4}$ | Pentamethyldiethylenetriamine | $7.1 \times 10^{-5}$ |
| Ex. 5 | A5 | BK-2 | E | $6.2 \times 10^{-4}$ | Pentamethyldiethylenetriamine | $6.2 \times 10^{-5}$ |
| Ex. 6 | A6 | BK-2 | A | $9.3 \times 10^{-4}$ | Pentamethyldiethylenetriamine | $1.8 \times 10^{-1}$ |
| Ex. 7 | A7 | BK-2 | A | $6.2 \times 10^{-4}$ | Pentamethyldiethylenetriamine | $1.2 \times 10^{-1}$ |
| Ex. 8 | A8 | BK-2 | A | $1.9 \times 10^{-3}$ | Pentamethyldiethylenetriamine | $3.3 \times 10^{-1}$ |
| Ex. 9 | A9 | BK-2 | A | $9.3 \times 10^{-4}$ | Pentamethyldiethylenetriamine | $7.4 \times 10^{-6}$ |
| Ex. 10 | A10 | BK-2 | A | $9.3 \times 10^{-4}$ | 2,2'-Bipyridyl | $4.7 \times 10^{-5}$ |
| Ex. 11 | A11 | BK-2 | B | $3.7 \times 10^{-4}$ | 2,2'-Bipyridyl | $4.5 \times 10^{-2}$ |
| Ex. 12 | A12 | BK-2 | B | $3.7 \times 10^{-4}$ | Pentamethyldiethylenetriamine | $1.1 \times 10^{-2}$ |
| Ex. 13 | A13 | BK-2 | C | $2.1 \times 10^{-3}$ | 2,2'-Bipyridyl | $2.5 \times 10^{-1}$ |
| Ex. 14 | A14 | BK-2 | C | $2.1 \times 10^{-3}$ | 1,1,4,7,10,10-Hexamethyltriethylenetetramine | $1.7 \times 10^{-1}$ |
| Ex. 15 | A15 | BK-2 | C | $2.1 \times 10^{-3}$ | 1,1,4,7,10,10-Hexamethyltriethylenetetramine | $1.1 \times 10^{-4}$ |
| Ex. 16 | A16 | BK-2 | C | $2.1 \times 10^{-3}$ | (E)-N-((pyridine-2-yl)methylene)octane-1-amine | $1.5 \times 10^{-2}$ |
| Ex. 17 | A17 | BK-2 | C | $2.1 \times 10^{-3}$ | (E)-N-((pyridine-2-yl)methylene)octane-1-amine | $3.2 \times 10^{-2}$ |
| Ex. 18 | A18 | BK-2 | D | $2.7 \times 10^{-4}$ | (E)-(pyridine-2-yl)-N-((pyridine-2-yl)methylene)methaneamine | $2.3 \times 10^{-2}$ |
| Ex. 19 | A19 | BK-2 | D | $2.7 \times 10^{-4}$ | (E)-(pyridine-2-yl)-N-((pyridine-2-yl)methylene)methaneamine | $1.4 \times 10^{-5}$ |
| Ex. 20 | A20 | CY-2 | D | $2.7 \times 10^{-4}$ | N,N-bis((pyridine-2-yl)methyl)octane-1-amine | $4.9 \times 10^{-3}$ |
| Ex. 21 | A21 | MG-2 | E | $5.7 \times 10^{-4}$ | N,N-bis((pyridine-2-yl)methyl)octane-1-amine | $3.4 \times 10^{-3}$ |
| Ex. 22 | A22 | YE-2 | E | $5.7 \times 10^{-4}$ | Tris((pyridine-2-yl)methyl)amine | $9.6 \times 10^{-3}$ |
| Ex. 23 | A23 | BK-2 | B | $3.7 \times 10^{-4}$ | Tris((pyridine-2-yl)methyl)amine | $3.7 \times 10^{-3}$ |
| Ex. 24 | A24 | CY-2 | C | $2.1 \times 10^{-3}$ | Tris((pyridine-2-yl)methyl)amine | $2.1 \times 10^{-2}$ |
| Ex. 25 | A25 | MG-2 | C | $2.1 \times 10^{-3}$ | Tris((pyridine-2-yl)methyl)amine | $1.5 \times 10^{-2}$ |
| Ex. 26 | A26 | YE-2 | D | $2.7 \times 10^{-4}$ | 4,4'-Dipeptidyl-2,2'-bipyridyl | $2.7 \times 10^{-3}$ |

TABLE 3-continued

| | Pigment dispersion liquid | Coloring material | Resin | Use amount P [mol] | Basic compound*[1] | Use amount L [mol] |
|---|---|---|---|---|---|---|
| Ex. 27 | A27 | BK-2 | D | $2.7 \times 10^{-4}$ | 2,2'-Bipyridyl | $2.7 \times 10^{-3}$ |
| Ex. 28 | A28 | CY-2 | E | $5.7 \times 10^{-4}$ | 4,4'-Diheptyl-2,2'-bipyridyl | $5.7 \times 10^{-3}$ |

*[1]The structures of basic compounds used in Examples are described in the specification.

[1] 2,2-Bipyridyl/(I-a)
[2] 4,4'-Diheptyl-2,2'-bipyridyl/(I-c)
[3] (E)-N-((pyridine-2-yl)methylene)octane-1-amine/(II-a)
[4] (E)-(pyridine-2-yl)-N-((pyridine-2-yl)methylene)methaneamine/(II-c)
[5] N,N-bis((pyridine-2-yl)methyl)octane-1-amine/(III-b)
[6] Tris((pyridine-2-yl)methyl)amine/(III-d)
[7] Pentamethyldiethylenetriamine/(IV-a)
[8] 1,1,4,7,10,10-Hexamethyltriethylenetetramine/(IV-b)

TABLE 4

| | Pigment dispersion liquid | Coloring material | Resin | Use amount P [mol] | Basic compound | Use amount L [mol] |
|---|---|---|---|---|---|---|
| Com. Ex. 1 | B1 | MA-8 | Comparative resin 1*[1] | $9.0 \times 10^{-4}$ | Not used | 0 |
| Com. Ex. 2 | B2 | BK-1 | Comparative resin 2*[2] | $7.1 \times 10^{-4}$ | Not used | 0 |
| Com. Ex. 3 | B3 | BK-1 | Comparative resin 3*[3] | $3.8 \times 10^{-4}$ | Not used | 0 |
| Com. Ex. 4 | B4 | BK-2 | E | $6.2 \times 10^{-4}$ | Not used | 0 |
| Com. Ex. 5 | B5 | BK-2 | A | $9.3 \times 10^{-4}$ | Not used | 0 |
| Com. Ex. 6 | B6 | BK-2 | B | $3.7 \times 10^{-4}$ | Not used | 0 |
| Com. Ex. 7 | B7 | BK-2 | C | $2.1 \times 10^{-3}$ | Not used | 0 |
| Com. Ex. 8 | B8 | BK-2 | D | $2.7 \times 10^{-4}$ | Not used | 0 |
| Com. Ex. 9 | B9 | C.I. PB-15:3 | A | $9.3 \times 10^{-4}$ | Monoethanolamine | $9.3 \times 10^{-4}$ |
| Com. Ex. 10 | B10 | C.I. PR-122 | B | $3.7 \times 10^{-4}$ | Diethanolamine | $3.7 \times 10^{-4}$ |
| Com. Ex. 11 | B11 | C.I. PY-128 | C | $2.1 \times 10^{-3}$ | Diethanolamine | $2.1 \times 10^{-3}$ |
| Com. Ex. 12 | B12 | BK-2 | Comparative resin 1*[1] | $9.0 \times 10^{-4}$ | Monoethanolamine | $4.0 \times 10^{-4}$ |
| Com. Ex. 13 | B13 | CY-2 | Comparative resin 3*[3] | $3.8 \times 10^{-4}$ | Monoethanolamine | $3.3 \times 10^{-4}$ |
| Com. Ex. 14 | B14 | BK-2 | F | $2.0 \times 10^{-4}$ | Diethanolamine | $4.0 \times 10^{-4}$ |
| Com. Ex. 15 | B15 | BK-2 | F | $2.0 \times 10^{-4}$ | Diethanolamine | $2.0 \times 10^{-3}$ |
| Com. Ex. 16 | B16 | C.I. PB-15:3 | D | $2.7 \times 10^{-4}$ | 2,2'-Bipyridyl | $1.4 \times 10^{-3}$ |
| Com. Ex. 17 | B17 | C.I. PR-122 | E | $5.7 \times 10^{-4}$ | 2,2'-Bipyridyl | $2.8 \times 10^{-3}$ |
| Com. Ex. 18 | B18 | C.I. PY-128 | E | $5.7 \times 10^{-4}$ | Tris((pyridine-2-yl)methyl)amine | $2.8 \times 10^{-3}$ |
| Com. Ex. 19 | B19 | BK-2 | Comparative resin 1*[1] | $9.0 \times 10^{-4}$ | Tris((pyridine-2-yl)methyl)amine | $2.0 \times 10^{-3}$ |
| Com. Ex. 20 | B20 | CY-2 | Comparative resin 3*[3] | $3.8 \times 10^{-4}$ | Pentamethyldiethylenetriamine | $1.7 \times 10^{-3}$ |
| Com. Ex. 21 | B21 | MG-2 | F | $7.3 \times 10^{-4}$ | Pentamethyldiethylenetriamine | $2.0 \times 10^{-3}$ |
| Com. Ex. 22 | B22 | YE-2 | F | $7.3 \times 10^{-4}$ | Pentamethyldiethylenetriamine | $2.0 \times 10^{-3}$ |

*[1]Comparative resin 1; a styrene-maleic acid random block copolymer
*[2]Comparative resin 2; n-butylmethacrylate-methacrylic acid block copolymer
*[3]Comparative resin 3; polyoxyethylene hexadecyl ether <Evaluation 1>

With each of the pigment dispersion liquids of Examples 1 to 28 and Comparative Examples 1 to 22, the following components were mixed and sufficiently stirred to prepare ink.

| | |
|---|---|
| Pigment dispersion liquid | 30.0 parts |
| Triethylene glycol | 10.0 parts |
| Tripropylene glycol | 10.0 parts |
| Ion exchanged water | 50.0 parts |

The pigment dispersion liquids of Examples 1 to 28 and Comparative Examples 1 to 22 were evaluated for dispersion stability. Inks using the pigment dispersion liquids of Examples 1 to 28 and Comparative Examples 1 to 22 were tested for ejection stability and quality, fastness and ejection stability of a printed image. Note that the quality, fastness and ejection stability were evaluated as follows. Each of the inks was installed in an inkjet recording apparatus P-660CII (manufactured by Canon Finetech Inc.) having an on-demand type multi-recording head, with which each of inks is ejected by applying thermal energy in accordance with a recording signal, and then, an image was printed on plain paper GF-500 (manufactured by Canon Inc) and evaluated. As a result, as shown in Table 5, the pigment dispersion liquid (ink) according to any one of Examples had good dispersion stability, storage stability and ejection stability as well as good image quality and fastness, compared to the pigment dispersion liquids (ink) of Comparative Examples. Furthermore, whether a complex between a basic compound and an alkaline metal was formed or not in ink was analyzed by use of a capillary electrophoresis measuring system. As a result, it was found that all basic compounds used in Examples had a sufficient effect upon the formation of a complex; however, no sufficient effect was obtained by use of monoethanol amine and diethanolamine used in Comparative Examples.

TABLE 5

| | Dispersion stability*1 | Intermittent ejection stability*2 | Continuous ejection stability*3 | Image quality*4 | Fastness*5 | Storage stability*6 |
|---|---|---|---|---|---|---|
| Ex. 1 | AA | AA | AA | AA | AA | AA |
| Ex. 2 | AA | AA | AA | AA | AA | AA |
| Ex. 3 | AA | AA | AA | AA | AA | AA |
| Ex. 4 | AA | AA | AA | AA | A | AA |
| Ex. 5 | A | AA | AA | AA | AA | A |
| Ex. 6 | A | AA | AA | AA | AA | A |
| Ex. 7 | A | AA | AA | AA | AA | A |
| Ex. 8 | AA | AA | AA | AA | AA | AA |
| Ex. 9 | A | AA | AA | AA | AA | A |
| Ex. 10 | AA | AA | AA | AA | AA | AA |
| Ex. 11 | A | AA | AA | AA | AA | A |
| Ex. 12 | AA | AA | AA | AA | AA | AA |
| Ex. 13 | A | AA | AA | AA | AA | A |
| Ex. 14 | A | AA | AA | AA | AA | A |
| Ex. 15 | AA | AA | AA | AA | AA | AA |
| Ex. 16 | AA | AA | AA | AA | AA | AA |
| Ex. 17 | AA | AA | AA | AA | AA | AA |
| Ex. 18 | A | AA | AA | AA | A | A |
| Ex. 19 | A | AA | AA | AA | A | A |
| Ex. 20 | AA | AA | AA | AA | A | AA |
| Ex. 21 | AA | AA | AA | AA | AA | AA |
| Ex. 22 | AA | AA | AA | AA | AA | AA |
| Ex. 23 | AA | AA | AA | AA | AA | AA |
| Ex. 24 | AA | AA | AA | AA | AA | AA |
| Ex. 25 | AA | AA | AA | AA | AA | AA |
| Ex. 26 | AA | AA | AA | AA | A | AA |
| Ex. 27 | AA | AA | AA | AA | A | AA |
| Ex. 28 | AA | AA | AA | AA | AA | AA |
| Com. Ex. 1 | C | C | C | B | B | C |
| Com. Ex. 2 | B | B | C | B | C | A |
| Com. Ex. 3 | B | C | C | C | C | C |
| Com. Ex. 4 | A | B | B | B | C | A |
| Com. Ex. 5 | A | B | B | C | C | A |
| Com. Ex. 6 | A | B | B | C | C | A |
| Com. Ex. 7 | A | B | B | C | C | A |
| Com. Ex. 8 | A | B | B | C | C | A |
| Com. Ex. 9 | B | B | C | C | C | A |
| Com. Ex. 10 | B | B | C | C | C | A |
| Com. Ex. 11 | B | B | C | C | C | A |
| Com. Ex. 12 | C | C | C | C | C | C |
| Com. Ex. 13 | C | C | C | C | C | C |
| Com. Ex. 14 | C | C | C | C | C | C |
| Com. Ex. 15 | C | C | C | B | B | C |
| Com. Ex. 16 | B | B | C | B | B | A |
| Com. Ex. 17 | B | B | C | B | B | A |
| Com. Ex. 18 | B | B | C | B | B | A |
| Com. Ex. 19 | C | C | C | B | B | C |
| Com. Ex. 20 | C | C | C | B | B | C |
| Com. Ex. 21 | C | C | C | B | B | C |
| Com. Ex. 22 | C | C | C | B | B | C |

*1: Dispersion stability

A storage test was performed by storing each pigment dispersion liquid in air-tight conditions of 80° C. for 2 weeks. Before and after the test, particle sizes were measured. The particle-size increase rate (%) was obtained in accordance with the following expression and used as an indicator.

Particle-size increase rate (%)=(Particle size after test−particles size before test)/Particle size before test×100

The particle size was measured by a dynamic light scattering method (using a laser particle size analysis system FPAR-1000® manufactured by Otsuka Electronics Co., Ltd.). Evaluation criteria are as follows:

AA: Particle-size increase rate is less than 5%.

A: Particle-size increase rate is not less than 5% and less than 10%.

B: Particle-size increase rate is not less than 10% and less than 30%.

C: Particle-size increase rate is 30% or more.

*2: Intermittent ejection stability

After each of the inks was stored at 70° C. for 2 weeks, a 100% solid image was printed in an environment of 15° C. and 10% humidity. After three-minute interval, a 100% solid image was again printed. The image thus obtained was evaluated based on the following evaluation criteria:

AA: No white stripe is observed and a normal image is printed.

A: White stripe is slightly observed in the first printing part of an image.
B: White stripe is observed all over the image.
C: No image is virtually printed.
*3: Continuous ejection stability
Post-card size gradation patterns (1000 patterns) were continuously printed. Dot misalignment of the 1000th image and ejection characteristics regarding ejection failure were evaluated based on the following criteria:
AA: No dot misalignment is observed without ejection failure and a normal image was printed.
A: No ejection failure is observed but dot misalignment is partly observed.
B: Ejection failure is partly observed and dot misalignment was observed all over the image.
C: Ejection failure is frequently observed and dot misalignment was observed all over the image.
*4: Image quality
After inks were stored at 70° C. for 2 weeks, images were printed by the inks and evaluated based on the following evaluation criteria:
AA: No bleeding of the image is observed and color intensity is high.
A: No bleeding of the image is observed but the color intensity is slightly low.
B: Bleeding of the image is slightly observed.
C: Bleeding of the image is frequently observed and the color intensity is low.
*5: Fastness
Solid images (100% solid) were printed by use of the inks stored at 70° C. for 2 weeks. One minute after the printing, the images were scratched (rubbed) with lens-cleaning paper while applying a load of $2 \times 10^4$ N/m$^2$. The resultant images were evaluated based on the following evaluation criteria:
AA: No scratches are observed and no deposit was observed on the lens-cleaning paper.
A: No scratches are observed but a deposit was observed on the lens-cleaning paper.
B: A few scratches are observed
C: A lot of scratches are observed.
*6: Storage stability
A storage test was performed by storing the inks in air-tight conditions of 70° C. for 2 weeks. Before and after the test, the particle sizes were measured. The particle-size increase rate (%) was obtained in accordance with the following expression and used as an indicator.

Particle-size increase rate (%)=(Particle size after test−particles size before test)/Particle size before test×100

The particle size was measured by a dynamic light scattering method (using a laser particle size analysis system FPAR-1000™ manufactured by Otsuka Electronics Co., Ltd.). Evaluation criteria are as follows:
AA: Particle-size increase rate is less than 5%.
A: Particle-size increase rate is not less than 5% and less than 10%.
B: Particle-size increase rate is not less than 10% and less than 30%.
C: Particle-size increase rate is 30% or more.
As described in the foregoing, according to the present invention, a pigment dispersion liquid which provides an ink capable of recording an image having high fastness and excellent image quality stably for a long time in any conditions can be provided. Furthermore, an ink, inkjet recording method and inkjet recording apparatus capable of recording an image having excellent fastness and quality can be provided.
While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-168443, filed Jun. 27, 2008 and No. 2009-139331, filed Jun. 10, 2009, which are hereby incorporated by reference herein in their entirety.

What is claimed is:

1. A pigment dispersion liquid comprising a polymer dispersant, a coloring material and water, wherein the polymer dispersant is formed of at least a hydrophobic unit and a hydrophilic unit, the hydrophobic unit having a block portion formed of at least one hydrophobic monomer; the coloring material is formed of a pigment having on its surface an acid form anionic group; and the pigment dispersion liquid further contains a basic compound capable of forming a complex with an alkaline metal,
wherein the hydrophilic unit comprises, as a repeating unit, an acrylic amide structure represented by the following general formula (1):

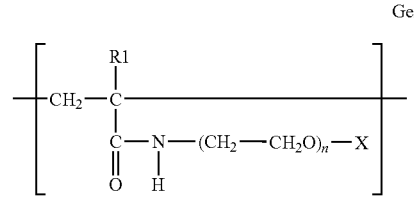

General formula (1)

where R1 represents a hydrogen atom or a methyl group; X represents a hydrogen atom or an alkyl group having 1 to 4 carbon atoms; and n is 1 to 10, and
wherein the basic compound is at least one compound selected from the group consisting of the following general formulae (2) to (5):

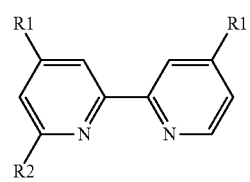

General formula (2)

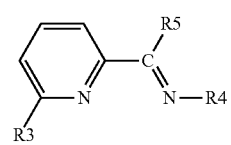

General formula (3)

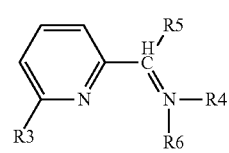

General formula (4)

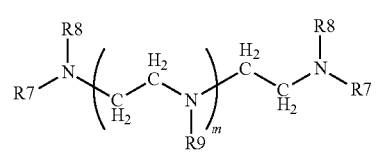

General formula (5)

where R1 represents a hydrogen atom or an alkyl group having 1 to 18 carbon atoms; R2 is a hydrogen atom or -Py-R1 (Py: pyridyl group); R3 is a hydrogen atom, —C(R5)=N—R4 or —CH(R5)-N(R6)-R4; R4 is an alkyl group having 1 to 18 carbon atoms, —CH$_2$-Py or —CH$_2$—CH$_2$—N(R6)-CH$_2$-Py (Py: pyridyl group); R5 is a hydrogen atom or a methyl group; R6 is a hydrogen atom or —R4; R7 and R8 are each an alkyl or alkenyl group having 1 to 4 carbon atoms; R9 is an alkyl group having 1 to 4 carbon atoms or —CH$_2$—CH$_2$—N(R8)-R7; and m is 1 or 2.

2. The pigment dispersion liquid according to claim 1, wherein the block portion formed of a hydrophobic monomer of the hydrophobic unit is a block portion formed of a repeating unit structure represented by the following general formula (6):

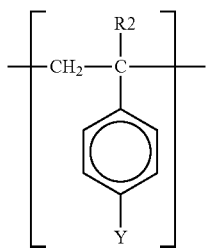

General formula (6)

where R2 represents a hydrogen atom or a methyl group; Y represents —R3, —OR3 or —COOR3 in which R3 represents an alkyl group having 1 to 18 carbon atoms.

3. The pigment dispersion liquid according to claim 1, wherein the hydrophilic unit has a segment having an anionic group.

4. The pigment dispersion liquid according to claim 1, wherein the hydrophilic unit has a block portion formed of the repeating unit structure of the general formula (1) and a block portion of a segment having an anionic group.

5. An inkjet recording ink comprising the pigment dispersion liquid according to claim 1.

6. An ink cartridge having an ink storage portion for storing an ink, wherein the ink is the inkjet recording ink according to claim 5.

7. An inkjet recording apparatus having an ink cartridge having an ink storage portion storing an ink and a head portion for ejecting the ink, wherein the ink is the inkjet recording ink according to claim 5.

8. An inkjet recording method comprising applying energy to an ink to cause the ink to fly, thereby applying the ink onto a recording medium, wherein the ink is the ink according to claim 5.

9. The inkjet recording method according to claim 8, wherein the energy is thermal energy.

* * * * *